(12) United States Patent
Gretz

(10) Patent No.: US 8,785,774 B1
(45) Date of Patent: Jul. 22, 2014

(54) ELECTRICAL OUTLET BOX ASSEMBLY

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 94 days.

(21) Appl. No.: 12/931,840

(22) Filed: Feb. 11, 2011

(51) Int. Cl.
*H01H 9/02* (2006.01)

(52) U.S. Cl.
USPC .................. 174/57; 174/50; 174/58; 248/343

(58) Field of Classification Search
CPC ......... H02G 3/12; H02G 3/121; H02G 3/123; H02G 3/125; H02G 3/126; H02G 3/128; E04B 9/006
USPC ........... 220/3.5; 248/243, 906, 205.1; 174/58, 174/50, 57, 63
See application file for complete search history.

(56) References Cited

U.S. PATENT DOCUMENTS

| | | | | |
|---|---|---|---|---|
| 2,316,389 A | * | 4/1943 | Atkinson | 248/300 |
| 4,943,022 A | * | 7/1990 | Rinderer | 248/205.1 |
| 4,967,990 A | * | 11/1990 | Rinderer | 248/205.1 |
| 5,038,985 A | * | 8/1991 | Chapin | 224/669 |
| 5,289,934 A | * | 3/1994 | Smith et al. | 220/3.7 |
| 5,386,959 A | * | 2/1995 | Laughlin et al. | 248/205.1 |
| 5,516,068 A | * | 5/1996 | Rice | 248/300 |
| 5,927,667 A | * | 7/1999 | Swanson | 248/300 |
| 7,271,335 B2 | * | 9/2007 | Dinh | 174/58 |
| 7,312,396 B1 | * | 12/2007 | Gorman | 174/58 |
| 7,472,875 B2 | * | 1/2009 | Rinderer | 248/200.1 |
| 7,544,889 B1 | * | 6/2009 | Sanchez | 174/58 |
| 7,572,977 B2 | * | 8/2009 | Gorman | 174/58 |
| 8,076,578 B1 | * | 12/2011 | Gretz | 174/57 |
| 2008/0296460 A1 | * | 12/2008 | Kerr, Jr. | 248/343 |

* cited by examiner

*Primary Examiner* — Anthony Stashick
*Assistant Examiner* — Ernesto Grano

(57) ABSTRACT

An electrical outlet box assembly for mounting an electrical device within a wall or floor. The assembly includes an outlet box, a sliding bracket, and a brace. The brace is mounted between two studs in a wall or joists in a floor. The outlet box may be positioned at almost any point along the length of the brace. Further, an adjustment screw, accessible from the front of the box, is integrated with the sliding bracket and outlet box such that rotation of the screw adjusts the location of the outlet box in relation to the sliding bracket. This adjustment permits a user to adjust the position of the outlet box so that it is substantially flush with the wall or floor surface.

2 Claims, 11 Drawing Sheets

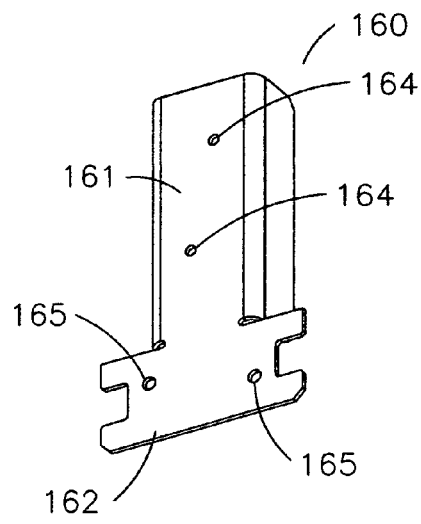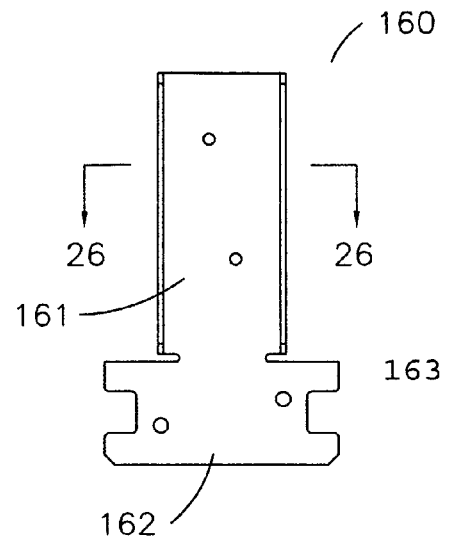
FIG. 26  FIG. 27
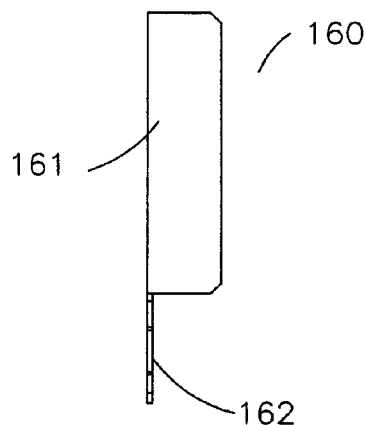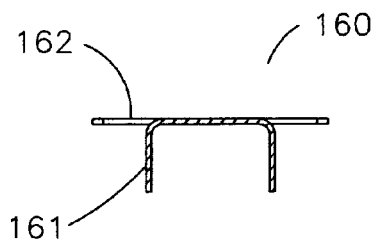
FIG. 28  FIG. 29

ELECTRICAL OUTLET BOX ASSEMBLY

FIELD OF THE INVENTION

The present invention relates to assemblies for the mounting of electrical devices, and, more specifically, to adjustable electrical outlet box assemblies which are typically installed and utilized in the interior walls of buildings and other structures.

BACKGROUND OF THE INVENTION

A common goal in installing electrical outlet boxes in interior walls is to install the front face of the box substantially flush with the wall surface. Conventional outlet boxes are typically fastened to a wall stud before the drywall is applied to the studs. As drywall is supplied in various thicknesses, it is difficult for the installer of the outlet boxes to position them correctly with respect to the eventual location of the wall surface. It is beneficial for such outlet boxes to include a feature which permits the adjustment of the outlet box in relation to the wall surface. Ideally, such adjustable outlet boxes would be fastened to a stud in the wall so as to be sufficiently stable and secured. Unfortunately, such a method of securing the outlet box limits positioning based upon the locations of the available studs. It is therefore desirable to have an outlet box assembly that can be secured to a stud for appropriate stability while still allowing placement in a location of choice within the wall.

The present invention provides mounting and adjusting options so as to offer a solution to the above-referenced issues. Further, the invention is of sufficiently simple design so as to allow it to be easily manufactured. These advantages, among others, can be achieved with the fully adjustable outlet box set forth herein.

OBJECT OF THE INVENTION

It is an object of the invention to provide an adjustable outlet box which facilitates positioning of the outlet box in relation to the thickness of the wall in which it is mounted and, further, permits the box to be secured at almost any location between two studs in the wall. The assembly is further designed so as to maintain the traditional amount of useable space within the outlet box while also being able to be economically manufactured.

SUMMARY OF THE INVENTION

The present invention describes a fully adjustable electrical outlet box assembly for mounting an electrical device within a wall. The assembly includes an outlet box, a sliding bracket, and a brace. The brace is mounted between two studs in the wall. The outlet box may be positioned at almost any point along the length of the brace. The outlet box is secured to the brace by the sliding bracket and a brace support plate. Further, an adjustment screw, accessible from the front of the box, is integrated with the sliding bracket and outlet box such that rotation of the screw adjusts the location of the outlet box in relation to the sliding bracket. This adjustment permits a user to adjust the position of the outlet box so that it is substantially flush with the wall surface.

DESCRIPTION OF THE DRAWINGS

FIG. 26 is a perspective view of the side-mounting bracket.

FIG. 27 is a front view of the side-mounting bracket.

FIG. 28 is a side view of the side-mounting bracket.

FIG. 29 is a top view of the side-mounting bracket.

TABLE OF NOMENCLATURE AND PARTS

Figure 1:
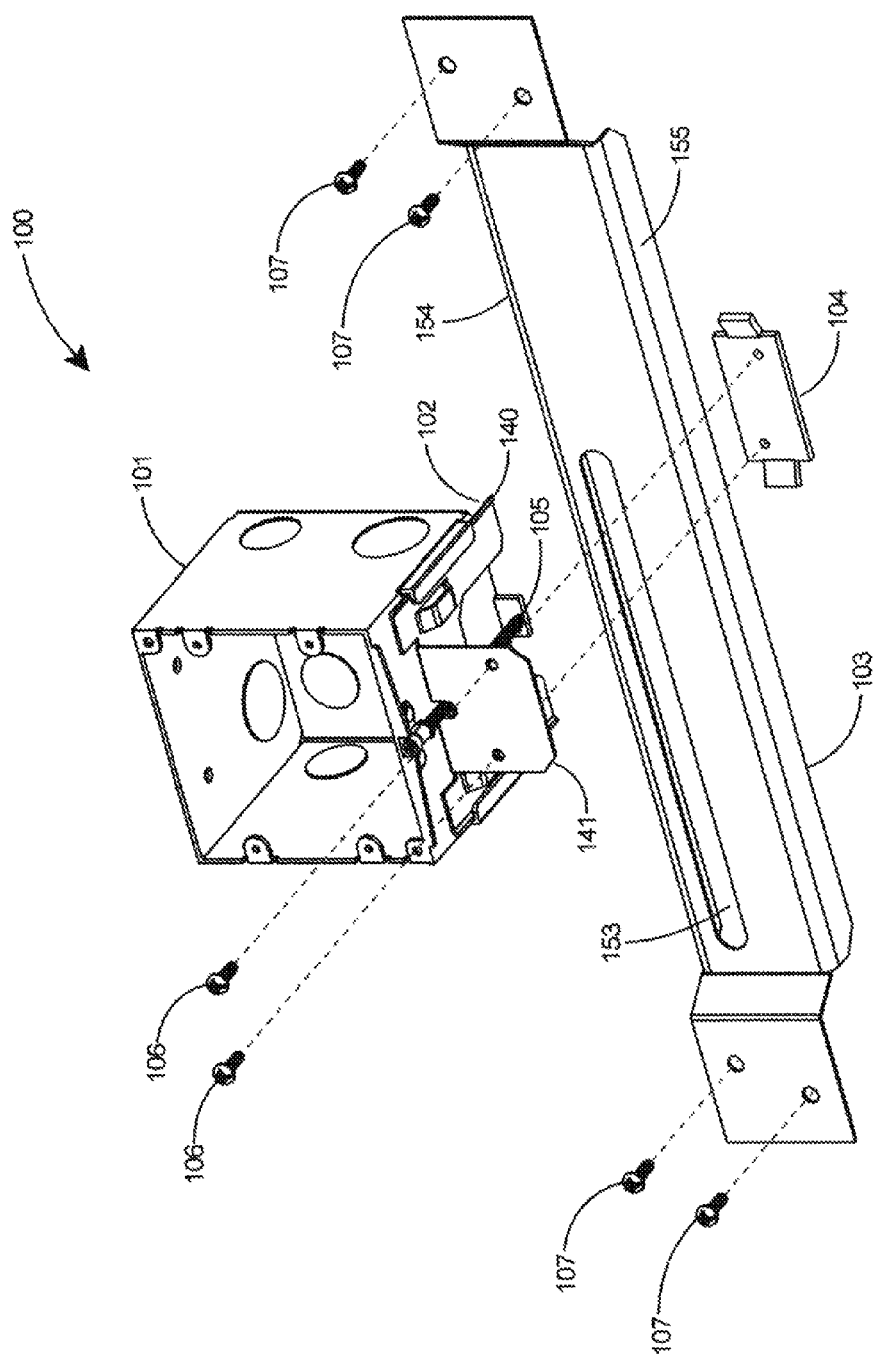
FIG. 1 is an exploded perspective view of a preferred embodiment of the fully adjustable electrical outlet box assembly disclosed herein.

The following is a listing of the parts, along with accompanying reference numerals, that are used to describe the invention set forth herein:

| Part Number | Brief Description |
| --- | --- |
| 100 | Electrical outlet box assembly |
| 101 | Box member |
| 102 | Sliding bracket |
| 103 | Brace |
| 104 | Brace support plate |
| 105 | Adjustment screw |
| 106 | Assembly screw |
| 107 | Wall fasteners |
| 120 | Upper box wall |
| 121 | Lower box wall |
| 122 | Rear box wall |
| 123 | Left box wall |
| 124 | Right box wall |
| 125 | Front edge of box |

| Part Number | Brief Description |
| --- | --- |
| 126 | Aperture |
| 127 | Arc-shaped channel |
| 128 | Bottom portion of lower wall |
| 129 | Tab |
| 129(a) | Aperture in tab |
| 130 | L-shaped channel |
| 131 | L-shaped channel |
| 140 | First portion of sliding bracket |
| 141 | Second (Flange) portion of sliding bracket |
| 142 | Front edge of Sliding bracket |
| 143 | Side of Sliding bracket |
| 144 | Arch |
| 145 | Aperture on Flange |
| 146 | Aperture on Flange |
| 147 | Edges on Sliding Bracket |
| 150 | Body portion of Brace |
| 151 | Brace flange |
| 152 | Apertures on Flange |
| 153 | Sliding Track |
| 154 | Top edge of Brace |
| 155 | Bottom edge of brace |
| 156 | Base section of Brace Support |
| 157 | Wing of Brace Support |
| 160 | Side-mounting bracket |
| 161 | Upper portion of side-mounting bracket |
| 162 | Lower portion of side-mounting bracket |
| 163 | Wing notches |
| 164 | Upper aperture set |
| 165 | Lower aperture set |
| 200 | Collar |
| 201 | Rivet |

DETAILED DESCRIPTION

FIG. 1 illustrates a preferred embodiment of the fully adjustable electrical outlet box assembly disclosed herein. The adjustable electrical outlet box assembly 100 includes a plastic box member 101, a sliding bracket 102, a hangar brace 103, and a brace support plate 104. The assembly 100 further includes a double-headed adjustment screw 105, assembly screws 106, and a plurality of wall fasteners 107.

Figure 2:
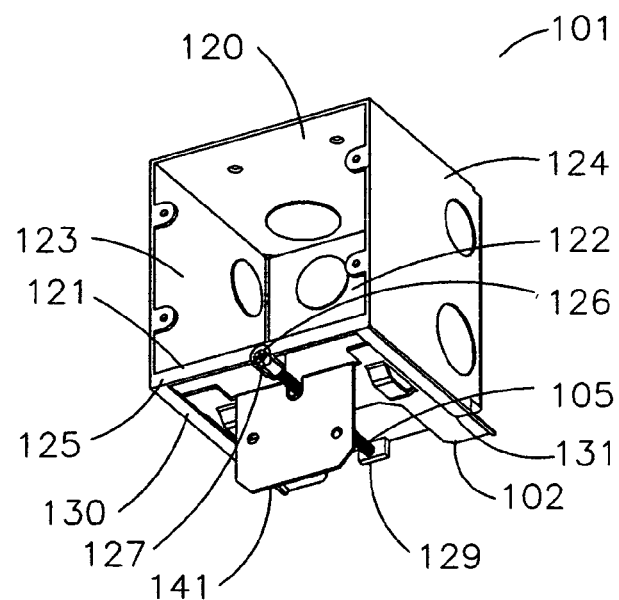
FIG. 2 is a perspective view of the box member and sliding bracket.

As seen in FIG. 2, the plastic box member 101 includes an upper wall 120, lower wall 121, rear wall 122, left wall 123, and right wall 124. One or more knockouts or removable sections may be provided in the left, right, or rear walls 122, 123, 124. The box member includes a front edge 125 which extends from the lower wall 121. The front edge 125 includes an aperture 126 which is disposed to receive the adjustment screw 105. The aperture 126 is substantially horizontally centered on the front edge 125. The aperture 126 leads to an arc-shaped channel 127 which extends along a portion of the bottom of the lower wall 121.

Figure 3:
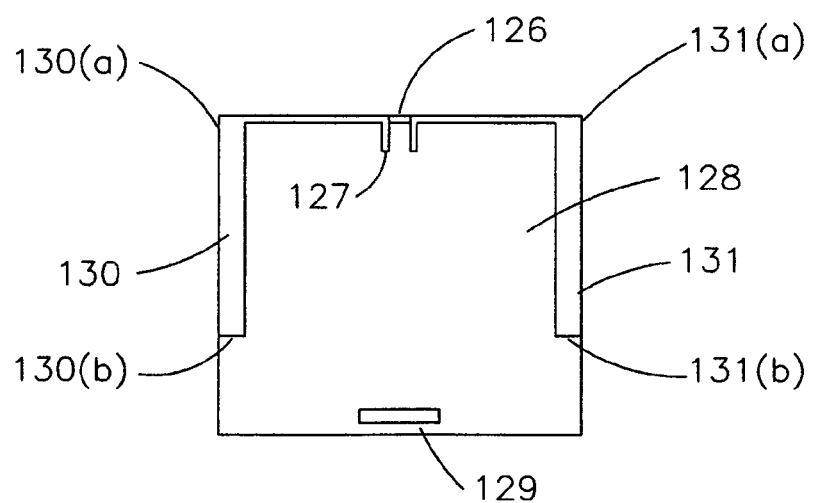
FIG. 3 is a planar view of the bottom side of the box member.

Referring now to FIGS. 2 and 3, the bottom side 128 of the lower wall 121 further includes a tab 129 to receive the adjustment screw 105. The tab 129 projects from the rear section of the bottom side 128 in a direction perpendicular to the lower wall 121. The tab 129 is substantially horizontally centered on the bottom side 128. The tab 129 may simply extend from the bottom side 128 or it may originate within the interior of the box member 101 and extend through a hole (not shown) in the lower wall 121. The tab 129 includes an opening 129(a) to receive the adjustment screw 105. The opening 129(a) is axially aligned with the aperture 126 and arc-shaped channel 127.

The bottom side 128 of the lower wall 121 also includes two L-shaped channels which are located on the left and right edges of the bottom side 128. Each L-shaped channel 130, 131 originates at the front portion of the bottom side 128 and extends for approximately three-quarters of the length of the bottom side 128. Accordingly, the end section of each channel 130, 131 is closed at the point of origination 130(a), 131(a) and is open at the point of termination 130(b), 131(b). It will be recognized that the box member may be a 4×4 electrical box, as shown herein, or any electrical or outlet box of similar design. Further, the box member may be constructed of plastic, metal, or any other suitable material.

Figure 4:
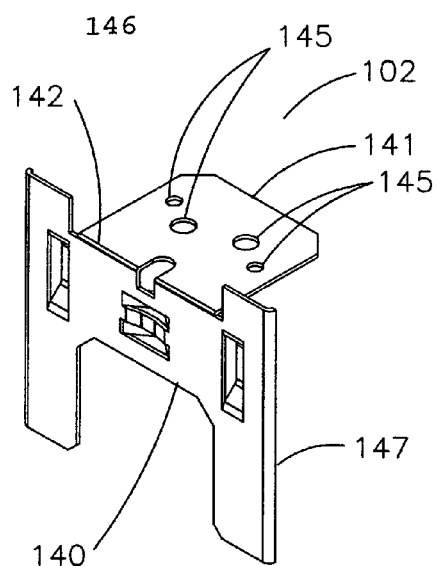
FIG. 4 is a perspective view of the sliding bracket.
Figure 5:
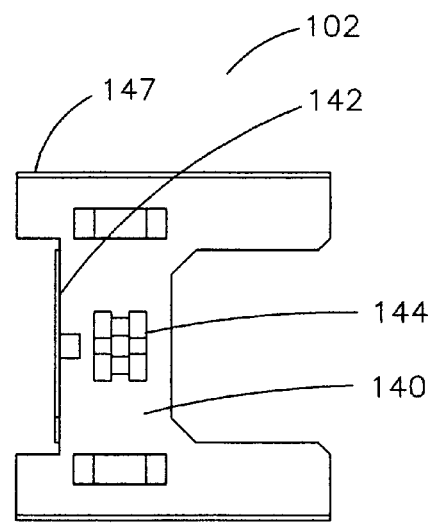
FIG. 5 is a top view of the sliding bracket.
Figure 6:
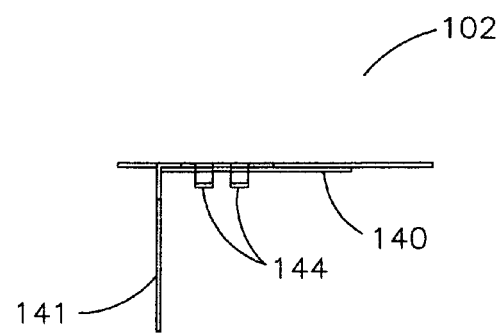
FIG. 6 is a side view of the sliding bracket.

The sliding bracket 102 includes a first portion or top end 140 and a second portion 141 as seen in FIGS. 4-6. The first portion 140 is essentially flat and includes a front edge or front side 142, sides 143 and one or more arches 144. The second portion or flange 141 extends orthogonally from the front edge 142 of the first portion 140. The flange 141 also includes apertures 145 on the body of the flange as well as a larger aperture 146 located at the intersection of the first portion 140 and second portion 141 and substantially horizontally centered on the flange 141. The sliding bracket 102 further includes edges 147 on each side of the bracket which extend outward and in a direction perpendicular to the plane of the first portion 140. As best seen in FIG. 1, at least one of the apertures 145 in the sliding bracket 102 is aligned with at least one aperture in the brace support plate 104, such that a screw or other fastening mechanism can be used to secure the brace support 104 to the sliding bracket 102.

Figure 7:
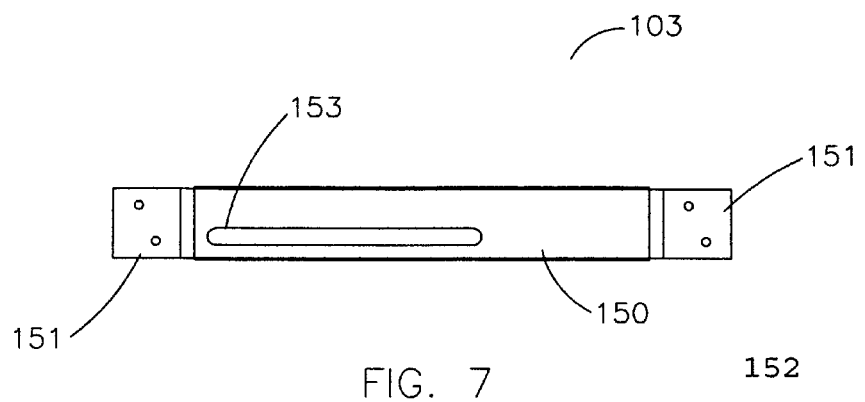
FIG. 7 is a front view of the brace hangar assembly.
Figure 8:
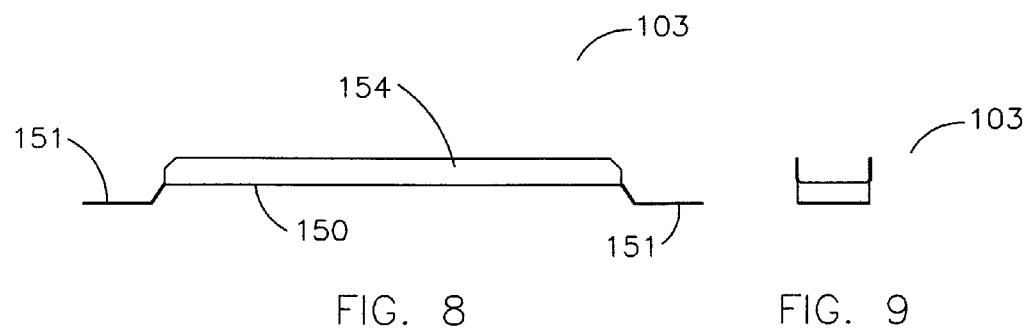
FIG. 8 is a plan view of the brace hangar assembly.
Figure 9:
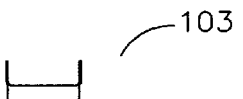
FIG. 9 is an end view of the brace hangar assembly.

Referring now to FIGS. 7-8, the hangar brace 103 includes a body member or portion 150 and a flange at each end 151. Each flange 151 includes one or more apertures 152. The brace further includes a sliding track 153 which consists of an aperture extending along at least a portion of the body of the brace 103. The body portion 150 may be formed as a U-shaped structure which includes a top edge 154 and bottom edge 155 that run the length of the body portion 150. The hangar brace 103 is a metallic element which, in a preferred embodiment, is at least sixteen inches (40 cm) in length. The hangar brace will be of such length as to be able to mount between two studs in either home or commercial construction. With regard to an embodiment for home use, the brace would be generally eighteen inches (45.72 cm) in total length from one flange end to the other. Each flange 151 would begin at a point approximately four inches (10.16 cm) from the respective ends of the hangar brace 103.

Figure 10:
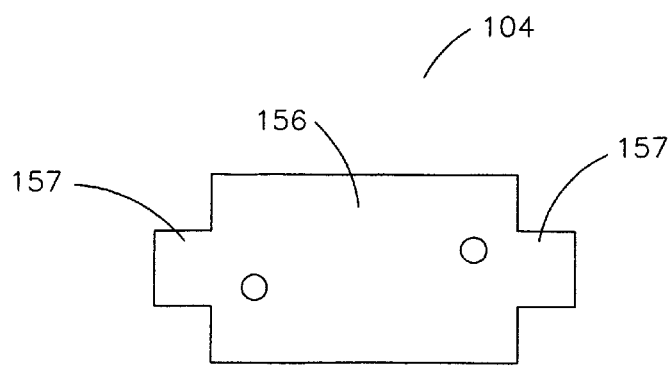
FIG. 10 is a planar view of the brace support plate.
Figure 11:
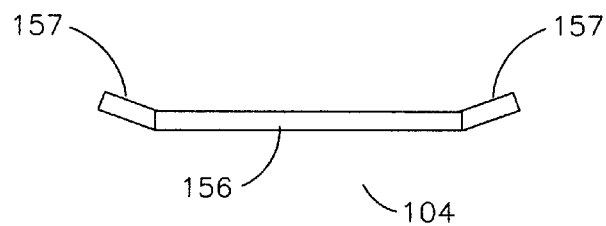
FIG. 11 is a top view of the brace support plate.
Figure 12:
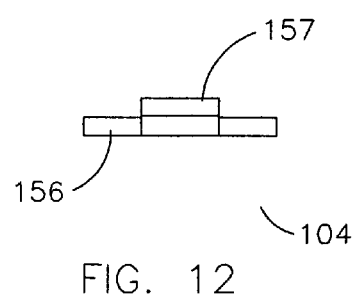
FIG. 12 is a side view of the brace support plate.

The brace support plate 104 is a flat metallic plate which consists of a base section 156 and a wing 157 located at each end. The base section 156 is generally rectangular in shape and includes one or more apertures. A wing 157, as seen in FIGS. 10-12, extends from each of the two short sides of the brace support 104. Each wing 157 is of a height that is less than that of the brace support 104 and extends at an angle from the plane of the base section 156. The angle of extension of the wings 157 will be less than one hundred eighty degrees, but will be greater than ninety degrees, from the plane of the base section 156.

As seen in FIG. 2, the sliding bracket 102 is mounted on the bottom side 128 of the lower wall 121. The sliding bracket is oriented such that the flange 151 extends away from the box member 101. The L-shaped channels 130, 131 on the bottom side 128 of the lower wall 121 are appropriately shaped to receive the edges 147 of the sliding bracket 102. The edges 147 are therefore slidably disposed within the L-shaped channels 130, 131 of the box member 101. The sliding bracket is reasonably free to move forward or backward within the confines of the channels 130, 131. The double-headed adjustment screw 105 shown in FIG. 13 includes a smooth portion and a threaded portion. The adjustment screw 105 passes through the aperture 126 in the second or flange portion of the sliding bracket 141 and along the arc-shaped channel 127.

The adjustment screw further passes through the one or more arches 134 found in the sliding bracket 102, and is ultimately received by the opening 129(*a*) of the tab 129. The adjustment screw 105 is held to the box member 101 by the tab 129. The arches 134 of the sliding bracket 102 engage the threaded portion of the adjustment screw 105. Rotation of the adjustment screw 105 therefore moves the box member 101 linearly with respect to the sliding bracket 102 with the direction of the movement dictated by the direction of rotation of the adjustment screw 105.

In a preferred embodiment, the second or flange portion 141 of the sliding bracket 102 would include two apertures 145. Commensurately, the brace support plate 104 would also include two apertures spaced such that the apertures of the brace support plate 104 may be aligned with the apertures in the sliding bracket 145.

In operation, the sliding bracket flange portion 141 is placed in the desired position at any point along the front portion of the sliding track 153. The apertures of the brace support plate 104 are then lined up with the apertures 145 in the sliding bracket. Fasteners, of any suitable type, are then passed through the flange 141, sliding track 153, and brace support plate 104 in order to removably secure the flange to the brace 103. It will be recognized that an effective method of removably securing the parts in this fashion would be through the use of one or more screws and hex nuts.

Figure 13:
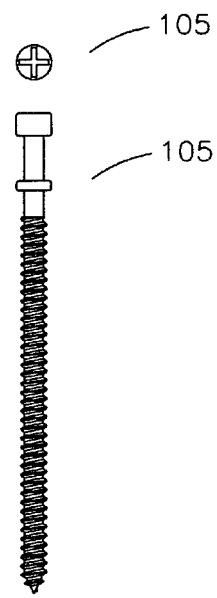
FIG. 13 shows a top view and a side view of the adjustment screw.
Figure 19:
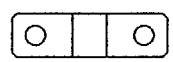
FIG. 19 is a planar view of the collar.
Figure 20:
FIG. 20 is a side view of the collar.
Figure 14:
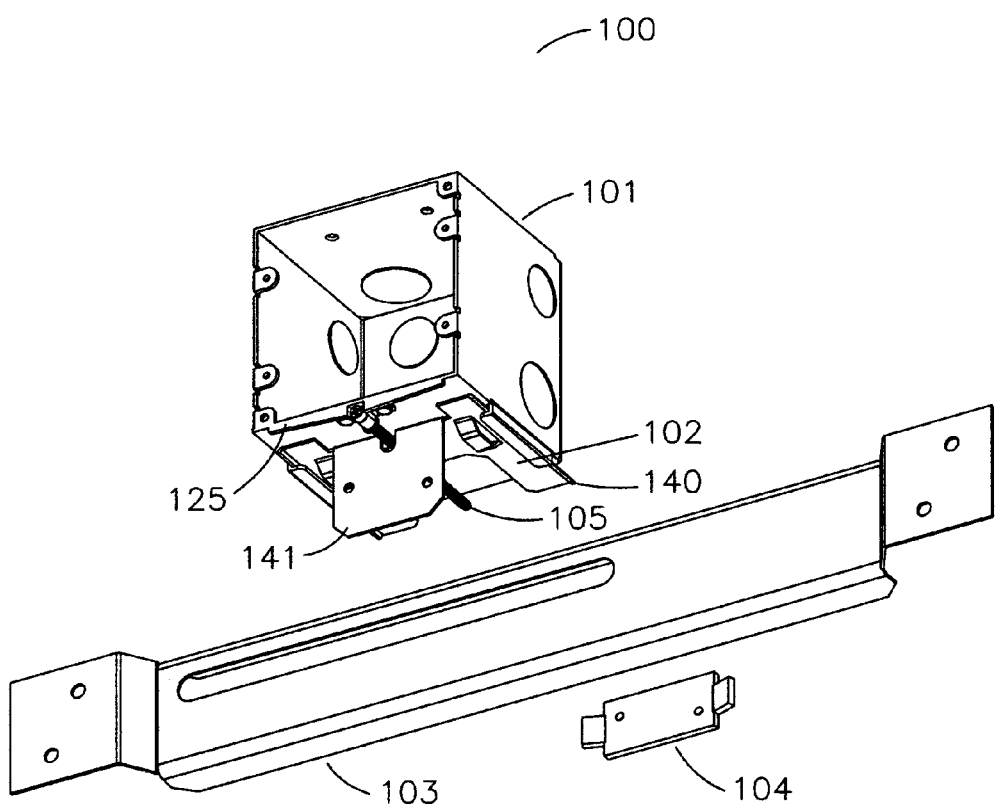
FIG. 14 is a perspective view of a second embodiment of the electrical outlet box assembly.
Figure 15:
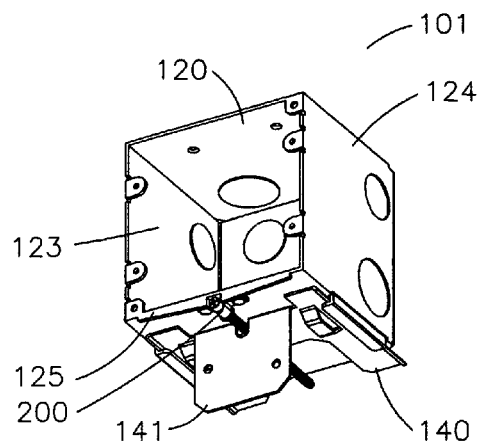
FIG. 15 a perspective view of the box member found in the second embodiment of the electrical outlet box assembly.
Figure 16:
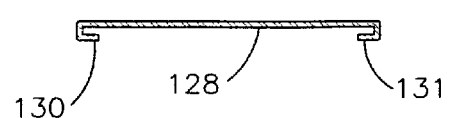
FIG. 16 is a rear view of the lower box wall of the second embodiment of the outlet box assembly.
Figure 17:
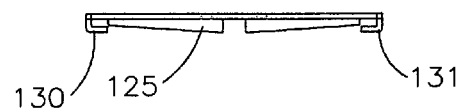
FIG. 17 is a front view of the edge of the lower box wall of the second embodiment of the outlet box assembly.
Figure 18:
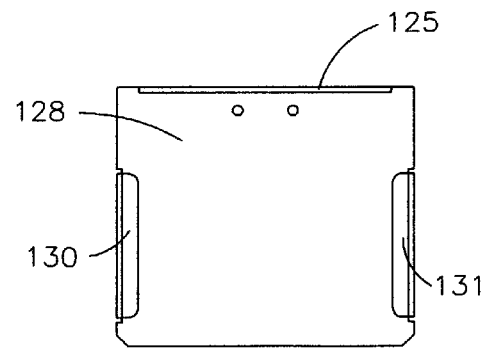
FIG. 18 is a planar view of the bottom side of the lower box wall of the second embodiment of the outlet box assembly.
Figure 21:
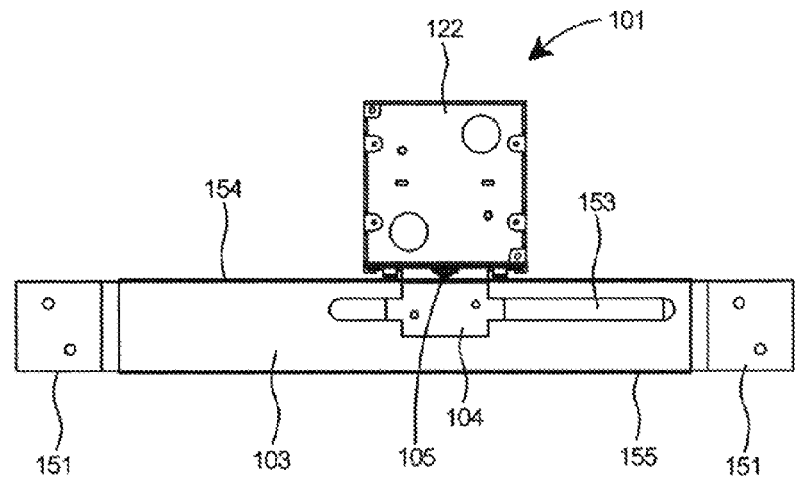
FIG. 21 is a rear view of an embodiment of the electrical outlet box assembly.
Figure 22:
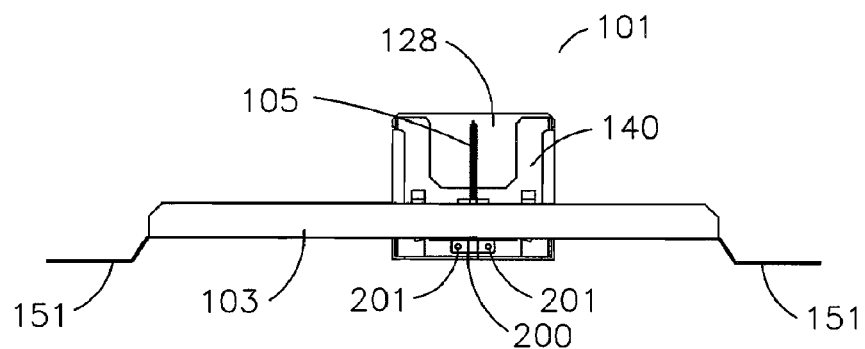
FIG. 22 is a bottom view of an embodiment of the electrical outlet box assembly.
Figure 23:
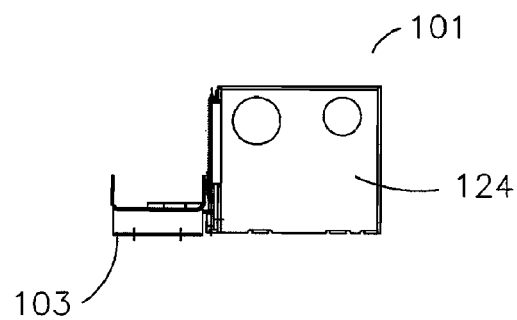
FIG. 23 is a side view of an embodiment of the electrical outlet box assembly.

In the alternate embodiment shown in FIGS. 14-18, the box member is configured slightly differently. In such an embodiment, a collar 200 is included and, as seen in the figures, the arc-shaped channel 127 and tab 129 are not present. The collar 200 is secured to the box member 101 by means of two rivets 202, although it be recognized that the collar 200 can be secured by any suitable means. The smooth portion of the adjustment screw 105 is held adjacent to the box member 101 by virtue of the collar 200. Since the smooth portion of the screw is in contact with the collar, the adjustment screw 105 is free to rotate within the collar without effecting any movement of the screw in relation to the box member 101. As seen in FIG. 13, the adjustment screw 105 is configured with a double head arrangement. The respective heads of the adjustment screw act to secure the adjustment screw 105 within the collar 200. Just as in the first described embodiment, the threaded portion of the adjustment screw 105 engages the threaded portion of the arch 144 or arches 144 on the sliding bracket 102. Rotation of the adjustment screw 105 moves the box member 101 linearly with respect to the sliding bracket 102. The direction of movement of the box member 101 is dictated by the direction of rotation of the adjustment screw 105. In this second embodiment, the box member 101 moves linearly with respect to the sliding bracket, as the double head arrangement of the adjustment screw 105 secures the adjustment screw to the box member 101 by allowing rotational movement of the screw within the collar 200 but preventing any travel of the adjustment screw 105 beyond the bounds of the collar 200.

In another alternate embodiment, a side-mounting bracket 160, shown in FIGS. 26-29, is included in the outlet box assembly. The side-mounting bracket 160 is composed of an upper portion 161 and a lower portion 162 which essentially form an inverted "T" shape. The upper portion 161 is composed of a flat section and two edges which extend from each side of the flat section such that the upper portion is essentially C-shaped, as shown in FIG. 29. The lower portion 162 consists of a flat portion with left and right edges which extend beyond the edges of the upper portion 161. Also, the lower portion 162 may include two wing notches 163. The side-mounting bracket further includes two sets of two apertures, an upper aperture set 164 located on the upper portion and a lower aperture set 165 located in the lower portion 162. The upper aperture set is positioned so as to be in alignment with the apertures on the flange portion 141 of the sliding bracket 102. The lower aperture set 165 is positioned so as to be in alignment with the apertures in the brace support plate 104.

Figure 30:
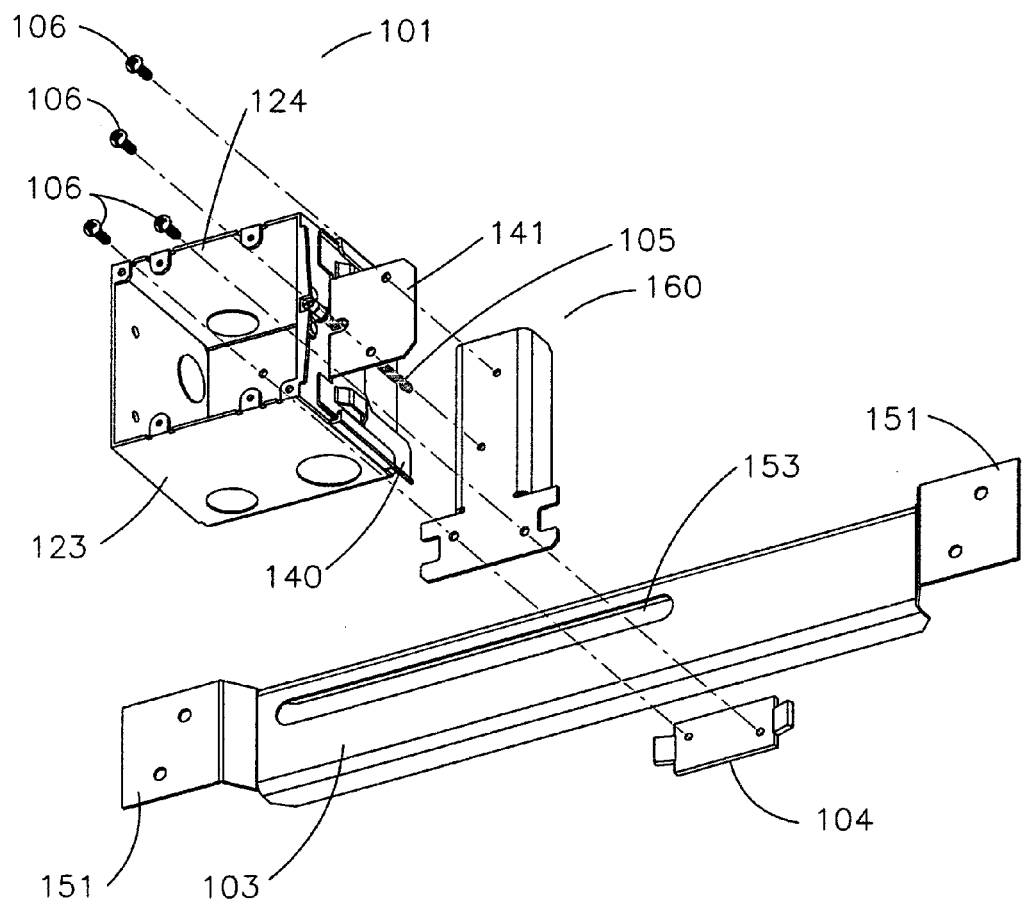
FIG. 30 is a perspective view of an embodiment of the electrical outlet utilizing a side-mounting bracket.

Referring now to FIG. 30, in assembled form, the side-mounting bracket is removably secured to the front of the brace 103 by fasteners which pass through the lower aperture set 165, the sliding track 152, and the brace support plate 104. The sliding bracket is then removably secured to the upper portion 161 of the side-mounting bracket 160 through the use of fasteners passing through the apertures 145, 146 on the flange portion 141 of the sliding bracket 102 and the upper aperture set 165. As best seen in FIG. 27, the side-mounting permits the box member to be mounted, in a different orientation from the standard mounting described in the first preferred embodiment. In this alternate embodiment, the box member is mounted on its side.

In all embodiments, the electrical box assembly 100 is mounted and utilized as follows: The brace 103 is positioned between two studs in the interior of a wall. The brace 103 is to be located such that the box member 101 is at the desired height in the wall, that is, at the desired vertical location in the wall. Each brace flange 151 is placed flush with a respective stud. The brace is then secured to the studs by fasteners 107 through the apertures in the flanges 152. The box member 101 is then positioned at the desired location along the length of the sliding track 153. It will be recognized that the aperture that forms the sliding track 153 may, but need not, extend along the length of the body portion of the brace 150. As seen in FIG. 1, the brace 103 can simply be rotated one-hundred and eighty degrees in order to re-orient the track 153 in relation to the studs. This permits the box member 101 to be situated at essentially any location between the studs. Once the box member 101 is positioned accordingly, the flange portion of the sliding bracket 141 is placed on the front side of the brace 103, i.e., the side facing out of the wall. The apertures in the flange 145 are oriented so that they are essentially adjacent to and aligned with the sliding track 153. The brace support plate 104 is placed on the rear or back side of the brace 103, i.e., the side that faces the wall interior. The apertures in the brace support plate 104 are aligned with the apertures in the flange 145 such that fasteners can be passed through the apertures in order to secure the flange 141 and brace support plate 104 to the brace 103. In this manner, the box member 101 may be situated at any position along the sliding track 153. The foregoing configuration permits a user to install the box member 101 at almost any x, y coordinate position between two studs.

Figure 24:
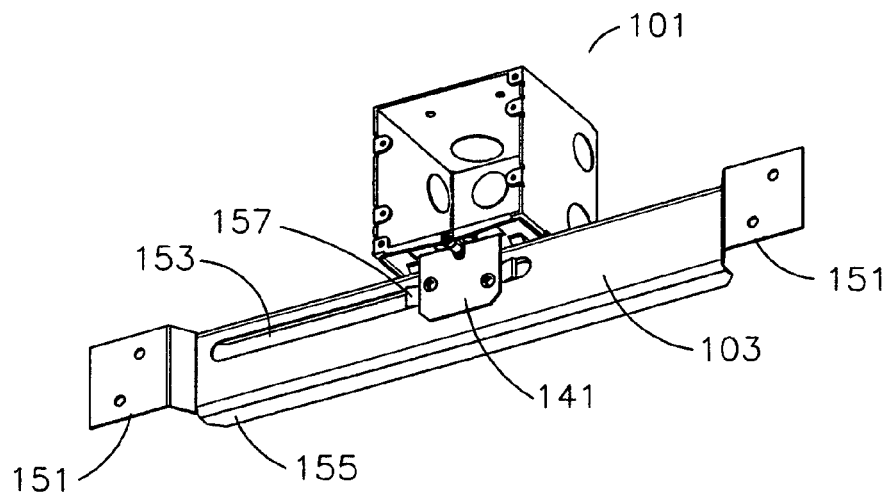
FIG. 24 is a perspective view of an embodiment of the electrical outlet box assembly showing one potential position of the adjustment screw and box member.
Figure 25:
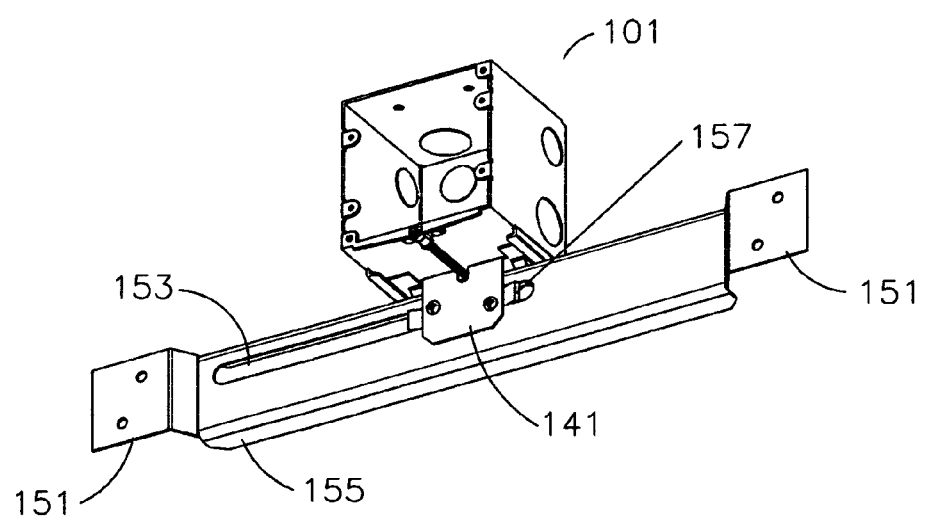
FIG. 25 is a perspective view of an embodiment of the electrical outlet box assembly showing a second potential position of the adjustment screw and box member.

Although installations may vary, once the box assembly 100 has been mounted at the desired location with respect to the studs, typically, sheetrock or some other wall covering would be placed over the box assembly 100. The sheetrock or other wall covering is then typically cut around the periphery of the box member 101 allowing access to the interior of the box member 101. After the box member 101 has been exposed, the adjustment screw 105 can then be turned to adjust the box member 101 with respect to the wall surface within which the box assembly 100 is mounted. The front edge 125 of the box member 22 is typically adjusted until it is approximately flush with the wall surface. It will be noted that the position of the box member 22 relative to the wall surface can be adjusted after the original installation. FIGS. 24 and 25 illustrate two alternate positions of the box member 101. With the addition of this final adjustment, the user is able to situate the box at a desired location in relation to both the studs and the wall face.

While the invention has been described in reference to certain preferred embodiments, it will be readily apparent to one of ordinary skill in the art that certain modifications or variations may be made to the system without departing from the scope of invention claimed below and described in the foregoing specification.

What is claimed is:

1. An adjustable electrical outlet box assembly to be mounted within a wall comprising:
    a box member having a bottom surface including a front edge, rear edge, left edge, and a right edge, L-shaped channels originating at said left edge and said right edge and extending along at least a portion of said bottom surface, an aperture in said front edge, and a collar adjacent to said aperture and affixed to said bottom surface;
    a brace hangar having a body member with a front side and a rear side, a top edge, and a flange on each end of said body member; said body member having a sliding track defined by an aperture extending horizontally along at least a portion of said body member; each said flange including at least one aperture therethrough;
    a sliding bracket having a substantially flat first portion including a section disposed within said L-shaped channels of said box member and a second portion extending orthogonally from said first portion and removably attached to said sliding track of said brace hangar by fasteners which pass through said sliding track; said first portion having one or more threaded arches extending from said first portion in a direction away from said box member;
    a brace support plate removably attached to said rear side of said body member of said brace hangar disposed to receive said fasteners;
    said brace support plate includes a base section with apertures and two angled wings, wherein the angled wings are configured to align in said sliding track;
    a double-headed adjustment screw passing through said aperture in said front edge of said box member and secured by said collar; said adjustment screw including a smooth base portion free to rotate with respect to said box member and a threaded portion engaging said one or more arches whereby rotation of said adjustment screw moves said box member with respect to said sliding bracket;
    said box member mounted along said top edge of said brace hangar and slideable with respect to said brace hangar;
    said double-headed adjustment screw positioned between said box member and said brace hangar, said double-headed adjustment screw enabling adjustment of the level of said box member with respect to said front side of said brace hanger.

2. The adjustable electrical outlet box assembly of claim 1 further comprising:
    an upright brace interposed between said second portion of said sliding bracket and said brace hangar; said upright brace support removably secured to said second portion of said sliding bracket and, further, removably secured to said brace hangar by fasteners which pass through said sliding track and are received by said brace support.

* * * * *